United States Patent [19]  [11] 4,374,886
Raghava  [45] * Feb. 22, 1983

[54] COLOR REGISTERED DECORATIVE LAMINATES

[75] Inventor: Ram S. Raghava, Ann Arbor, Mich.

[73] Assignee: Formica Corporation, Cincinnati, Ohio

[*] Notice: The portion of the term of this patent subsequent to Mar. 30, 1999, has been disclaimed.

[21] Appl. No.: 202,108

[22] Filed: Oct. 30, 1980

Related U.S. Application Data

[63] Continuation-in-part of Ser. No. 46,141, Jun. 6, 1979, abandoned.

[51] Int. Cl.³ .................. B32B 3/30; B32B 31/20
[52] U.S. Cl. ................... 428/172; 156/222; 428/207; 428/211; 428/525; 428/530; 428/531; 428/913
[58] Field of Search ............. 428/165, 172, 524, 530, 428/211, 206, 207, 525, 526, 208, 323, 328, 332, 342, 531, 535, 913, 98; 156/219, 220, 222, 331.1, 331.3, 277, 278, 386, 581; 427/372.2, 261, 262, 276

[56] References Cited

U.S. PATENT DOCUMENTS

| | | | |
|---|---|---|---|
| 2,392,574 | 1/1946 | Brown | 428/525 |
| 3,373,071 | 3/1968 | Fuerst | 428/525 |
| 3,445,327 | 5/1969 | Fuerst | 428/450 |
| 3,563,844 | 2/1971 | Brown | 428/525 |
| 3,968,291 | 7/1976 | Chevalier | 428/206 |
| 4,109,043 | 8/1978 | deLapp | 428/206 |
| 4,112,169 | 9/1978 | Huffman et al. | 428/206 |
| 4,154,882 | 5/1979 | Ungar et al. | 428/172 |
| 4,305,987 | 12/1981 | Scher et al. | 428/172 |
| 4,322,468 | 3/1982 | Raghava | 428/211 |

FOREIGN PATENT DOCUMENTS 546143 2/1974 Sweden .

OTHER PUBLICATIONS

The Merck Index, 7th Ed., 1960, p. 834.

Primary Examiner—Stanley S. Silverman
Attorney, Agent, or Firm—Frank M. Van Riet

[57] ABSTRACT

The use of a pigmented, fully-hydrolyzed polyvinyl alcohol modified melamine-formaldehyde resin coating in color registered decorative laminates provides improved laminates exhibiting pleasing aesthetics.

9 Claims, No Drawings

COLOR REGISTERED DECORATIVE LAMINATES

CROSS-REFERENCE TO RELATED APPLICATIONS

This application is a continuation-in-part application of application Ser. No. 46,141, filed June 6, 1979, now abandoned.

BACKGROUND

This invention generally relates to decorative laminates and methods of producing the same. More particularly, this invention relates to color registered decorative laminates employing a fully hydrolyzed polyvinyl alcohol modified melamine-formaldehyde resin coating in place of an overlay sheet.

Conventionally, decorative laminates are made of three essential layers: a core layer, a print layer, and a surface layer. The core layer constitutes a bottom or supporting layer onto which the other layers are bonded. In normal high-pressure laminate manufacture the core layer consists of a plurality of cellulosic sheets. The core sheets are generally made from a kraft paper impregnated with a laminating resin. Laminating resins commonly used for the core layer include phenolic, amino, epoxy, polyester, silicone, and diallyl phthalate resins to name but a few. The industrially preferred laminating resin for decorative laminates appears to be a phenolic resin made from the reaction of phenols with formaldehyde. In low-pressure laminate manufacture the core layer is generally comprises of a sheet of particleboard ranging from ⅜" to 1" in thickness.

Placed above the core layer is the print layer which is generally an alpha cellulose pigmented paper containing a print, pattern, or design that has been impregnated with a melamine-formaldehyde resin. Typically, the printing is performed prior to impregnation by a high-speed rotogravure.

The cured melamine-formaldehyde resins are colorless and resistant to light; they are resistant to a variety of solvents and stains; and their heat resistance makes them immune to burning cigarettes, boiling water and heated containers up and stains; and their heat resistance makes them immune to burning cigarettes, boiling water and heated containers up to about 325° F. Without these melamine-formaldehyde resins the decorative laminate industry would not exist as it is known today. However, because these resins are extremely brittle, they sometimes require reinforcement.

The surface layer, or overlay as it is commonly referred to, is a high-quality alpha cellulose paper impregnated with a melamine-formaldehyde resin. This layer protects the print sheet from external abuse such as abrasive wear and tear, harsh chemicals, burns, spills and the like. It is primarily the melamine-formaldehyde resin which accounts for these protective properties. The alpha-cellulose paper acts as a translucent carrier for water-thin resin, imparts strength to the rather brittle melamine-formaldehyde resin, maintains a uniform resin thickness in the overlay by acting as a shim, and controls resin flow.

The core layer, print layer and surface layer are stacked in a superimposed relationship, between stainless steel plates and subjected to a pressure and temperature for a time sufficiently long enough to cure the laminating resins impregnating the respective layers. The elevated temperatures and pressure actually cause the impregnated resins within the sheets to flow which consolidates the whole into an integral mass, known as the laminate. These laminates find use as counter tops, table tops, furniture, store fixtures and the like.

For obvious economic reasons, it is common practice, when producing the paper supported laminates, to consolidate a plurality of these individual laminating assemblies into one large assembly, or press pack, said stacks being separated from one another by a release sheet, and then to laminate this pack by heat and pressure application.

In consolidating the laminate components according to most widely practiced techniques, an individual assembly is placed with its decorative overlayment surface adjacent to a highly polished stainless steel press plate. The function of the press plate is twofold. First, it provides a smooth, defect-free surface to one side of the laminate. Second, in connection with the paper based supported systems, it serves to separate pairs of back-to-back assemblies, thus permitting a plurality of these assemblies to be consolidated into laminates in one operation, usually in back-to-back relationship.

In the earliest days of the high pressure laminating art, the smooth, glossy surface produced during the pressing operation was sometimes, upon customer's request, reduced to a matte finish by rubbing the surface with pumice. Subsequently, a slightly textured surface was produced by pressing the laminate surface against an aluminum foil caul stock. Such a surface was described as mini-textured because the hilltop-to-valley bottom depth of such textures was from about 0.5 mil (0.0005 inches) to about 1.0 mil (0.001 inches). These mini-textured laminates met with immediate success and almost totally replaced the glossy surface market. Somewhat coarser textures or three dimensional surfaces, sometimes called "low-relief" laminates were then produced, e.g. by a printing process known as the "heavy ink" method, described in U.S. Pat. No. 3,373,068. These surfaces had hill-to-valley depths of about 3 to 5 mils.

Finally, very deep, three dimensional textured or embossed laminates were offered commercially. These laminates may be produced by e.g. the methods of U.S. Pat. Nos. 3,860,470, Jaisle et al., and 3,718,496, Willard. Here the hill-to-valley depth in the surface is of the order of about 20 mils.

The techniques used to produce these deep textured surfaces encompass a design latitude heretofore not achieved by producing simulated patterns such as those occurring in natural materials like sandstone, brick, slate, mosaic, marble, leather, rough or weathered timber; even material like rough woven goods such as jute, hemp, etc.

As demands for these new laminates grew, many new designs, such as those simulating tiles or heavy woven cloth, evolved. These designs must have appropriate color contrast and registry with the surface hill-to-valley configuration. Unfortunately, the problem of registration of color and embossing has proven very difficult to solve. The problem has plagued the industry, not only from the standpoint of the appearance of the finished laminate but from the standpoint of the cost of the production of laminates having a substantially perfect registry of color and embossment, since their inception.

One method of overcoming the above deficiencies is set forth in copending applications Ser. Nos. 889,676 and 889,677 filed Mar. 24, 1978, now abandoned and assigned to the same assignee as this invention. According to these applications, there is provided a method of consolidating an assembly comprising a rigidity imparting substrate, a fibrous decor sheet impregnated with a first thermosetting resin, and a second pigmented thermosetting resin layer, which method comprises consolidating the assembly described above under heat and pressure by an embossing press plate having a surface with protuberant and valley areas capable of being impressed into the overlay and fibrous decor sheets, together, an embossment of the decor sheet and a migration of the pigmented resin from the areas of said embossment corresponding to the protuberant areas of the embossed press plates to the valley areas thereof.

Employment of the overlay sheet has, however, generated a host of unwanted problems. The overlay contributes substantial material cost to the manufactured laminate. Not only are there raw material costs involved, such as expensive high-quality alpha cellulose paper and melamine-formaldehyde resins, but there exists substantial processing costs, such as collating sheets, scrap losses generated by the brittle and difficult-to-handle impregnated sheets, as well as the cost of impregnation itself. In addition to these unwanted expenditures and processing steps, the translucent character of the overlay sheet becomes visually disturbing in decorative laminates when, through the use of more advanced printing techniques, a sharper, more intricate design is employed.

Thus, there exists the need for substitution of the overlay sheet by a tough and transparent thermoset layer that will eliminate haze or blur, incur fewer processing steps and lower costs, and yet maintain sufficient resistance to external abuse to be commercially acceptable. The provision for such a layer would fulfill a long-felt need and constitute a significant advance in the art.

SUMMARY OF THE INVENTION

The present invention provides a novel process for obtaining an exact registry of color and embossment in high and low pressure laminate production, the assembly for producing it and the laminate per se, by substituting a fully hydrolyzed polyvinyl alcohol (PVA) modified melamine-formaldehyde resin coating for the conventional overlay sheet as the protective surface layer in laminates. The application of this modified thermosetting resin allows for the elimination of the overlay sheet thereby providing substantial processing and cost savings in the manufacture of laminates. This method is more commercially significant than previously known systems because it is more economical and obviates many of the disadvantages of the prior procedures. When utilizing the novel process, there is no limit to dimension, design, depth of embossment or color which can be achieved. It avoids the mechanical registering of extraneous embossing media with decorative sheets in the laminates before or after pressing and the application of materials at press time.

According to the novel invention one may produce a mar-resistant decorative laminate having on its decorative surface, protrusions of any selected design, which protrusions are of a different color from the background surface of the laminate. Furthermore, one may produce a mar-resistant decorative laminate in multi-color having protrusions which extend outwardly from the decorative surface of the laminate which protrusions have on their surface a different color than that of the background material in relief. Finally, the transparent nature of this resin provides for a clear and undistorted appearance of the print, pattern or design in the decorative laminate.

DETAILED DESCRIPTION OF THE INVENTION

In accordance with the present invention there is provided a heat-and-pressure laminate assembly consists essentially of, in superimposed relationship, a core layer comprised of a self-supporting substrate, a resin impregnated print layer consisting of an opaque alpha cellulose paper sheet, a pigmented surface coating of a fully hydrolyzed polyvinyl alcohol (PVA) modified melamine-formaldehyde resin wherein the surface coating weight is from about 0.5 to about 20 grams per square foot and the amount of fully hydrolyzed PVA in the surface coating is from about 5 to about 30 percent by weight of the total weight of the malamine-formaldehyde reaction product solids, and said pigmented surface coating has a flow sufficient to cause said pigmented surface coating to flow more than said resin impregnating the print layer, and an embossing press plate having a surface with protuberant and valley areas capable of being impressed into the uppermost of said print layer and means for preventing the embossing press plate from sticking to the coated print sheet during lamination.

A method is set forth herein for producing a heat-and-pressure consolidated laminate which comprises consolidating the assembly described above under heat and pressure to thereby effect a lamination of said fibrous sheets together, an embossment of the uppermost of the print sheet and a migration of the pigmented resin from the areas of said embossment corresponding to the protuberant areas of the embossed press plates to the valley areas thereof and thereafter removing said embossing press plate from the resultant laminate so as to produce a dense laminate having embossed areas of contrasting color.

Additionally, set forth herein is a heat-and-pressure consolidated laminate of registered embossment and color contrast comprising, in superimposed relationship, a core layer comprised of a self-supporting substrate, a resin impregnated print layer consisting of an opaque alpha cellulose paper sheet, and a pigmented surface coating of a fully hydrolyzed polyvinyl alcohol (PVA) modified melamine-formaldehyde resin wherein the surface coating weight is from about 0.5 to about 20 grams per square foot and the amount of fully hydrolyzed PVA in the surface coating is from about 5 to about 30 percent by weight of the total weight of the melamine-formaldehyde reaction product solids and said pigmented surface coating has a flow sufficient to cause said pigmented surface coating to flow more than said resin impregnating the print layer. The surface of said laminate contains an embossment consisting of protuberances and valleys each of which are of a different color.

The core layer of the laminate may contain either a plurality of sheets impregnated with a laminating resin or a commercially available pressed particleboard. In high-pressure laminates, the core layer is typically provided by a plurality of impregnated sheets. These sheets can be varied in their nature in accordance with the particular properties desired in the decorative laminate. Typically, the core layer is made from paper, woven fabrics, mats, felts, or the like. Paper is by far the most widely used and thus constitutes the preferred stock for the core layer in high-pressure laminates. More particularly, a kraft paper of about a 60 to about a 130 pound basis weight per 3000 square foot ream is preferred as the stock from which the core layer sheets are prepared for high-pressure laminates because of its strong, cheap and plentiful nature. In low-pressure laminates, a particleboard of from about ⅜ to about 1 inch in thickness is preferred as the self-supporting substrate comprising the core layer. Suitable particleboards are commercially available in plentiful quantities at moderate cost.

The laminating resins used for impregnating the sheets of the core layer can be any of those thermosetting resins conventionally used in the production of laminates. Laminating resins conventionally used include, but are not limited to, phenolic, amino, epoxy, polyester, silicone and diallyl phthalate resins. The most commonly employed laminating resins, and that preferred in the instant invention, is the condensation product of a phenol and an aldehyde, generally referred to as a phenolic resin. In particular, it is preferable to employ an alkaline catalyzed phenol-formaldehyde condensation product as the laminating resin employed in the core layer. These resins can be purchased commercially or prepared according to conventional procedures. When using such a resin, it is preferred to impregnate and dry the impregnated sheets, by methods known in the art, to a resin content of from about 25% to 45%, and more preferably to a resin content of about 30%, based on the weight of resin solids in the impregnated sheets. The volatile content of the dried impregnated sheet is preferably between 5% to 10%, more preferably about 8%, based on the total weight of the sheet.

The alpha cellulose sheet used in the print layer of the laminate generally runs from about 50 to about 120 pound basis weight per 3000 square foot ream. Upon this alpha cellulose sheet is displayed a print, pattern, design or color suitable for the intended use of the laminate. The decorative print, pattern or design is typically applied by a high-speed rotogravure before the sheet is impregnated with the melamine-formaldehyde resin. Recently, photogravure reproductions of natural materials such as wood, marble, and leather have been applied to these alpha cellulose sheets as well. Typically, a three-ink system is employed with the alpha cellulose sheet itself being highly pigmented to provide a fourth color as background and as an opaque base by which the core layer is accordingly obscured. Although printing can be accomplished at any time prior to impregnation of the melamine-formaldehyde resin, printing is often done immediately before the impregnation. Printing houses make available, for those laminators not equipped with printing equipment, already printed alpha cellulose paper of various prints, patterns, or designs.

Suitable melamine-formaldehyde resins for impregnation of the print layer are prepared by reacting melamine with formaldehyde in an aqueous dispersion or solution. The mole ratio of the melamine to formaldehyde may be varied from about 1:1 to about 1:3, respectively. It is preferred that the mole ratio be controlled from about 1:1.3 to about 1:2, melamine to formaldehyde, respectively. The reaction occurs under alkaline conditions at a temperature ranging from about 70° to the reflux temperature until a clear reaction product is obtained.

When a low pressure decorative laminate is being produced, the print layer may also constitute any of the above-described decor sheets. The core, however, as mentioned above, comprises a particleboard ranging in thickness from about ⅜" to 1" which is produced in a manner known in the art. Medium density, mat formed, wood particleboard and medium density, wood fiberboard substrates are preferred.

The fully hydrolyzed PVA modified melamine-formaldehyde resin used as a coating over the print layer not only obviates the need for an overlay sheet but provides a high-wear, clear, craze-free decorative laminate that is aesthetically more pleasing. The polyvinyl alcohol is employed as a plasticizer with considerable ductility whose particles in the brittle matrix of the melamine-formaldehyde resin provide for a toughening of the thus-modified resin. The fully hydrolyzed PVA is required over the partially hydrolyzed PVA for use in the melamine-formaldehyde resin because the partially hydrolyzed PVA modified melamine-formaldehyde has exhibited too short of a shelf-life (time lapse before gelation) for practical purposes, even when stabilizers such as o,p-toluene sulfonamide have been added. Fully hydrolyzed PVA is commercially available for use in the present invention. The fully hydrolyzed PVA employed in the coating layer generally will not be prepared by hydrolysis of polyvinyl alcohols in the conventional manner. Instead, the fully hydrolyzed PVA is the product of fully hydrolyzing a polyvinyl ester, such as polyvinyl acetate or polyvinyl formate. This procedure is more efficient, less costly, and results in a polyvinyl alcohol having a degree of hydrolysis equal to or greater than about 99.0 percent of the acetate groups on a dry basis. However, the term "fully hydrolyzed PVA" is generally recognized in the trade to apply to this highly hydrolyzed polyvinyl ester, and as such will continue to be applied herein.

In preparing the fully hydrolyzed PVA modified melamine-formaldehyde resin of the present invention, the first stage in the preparation of this coating is the reaction between melamine and formaldehyde. Although, the fully hydrolyzed PVA may be added after the reaction of the melamine and formaldehyde, it is preferrable to add the fully hydrolyzed PVA to the initial stage. The mole ratio of melamine to formaldehyde can be varied from about 1:1 to about 1:3, respectively. The reaction is to be carried out in an aqueous dispersion or solution. To facilitate this aqueous phase reaction, aqueous formaldehyde solutions commercially available are usually employed in the preparation of the modified resin.

The reaction between melamine and formaldehyde should occur under alkaline conditions. The preferred pH range of the reaction is 7.5 to 10. For this purpose, a buffering material to control the pH is traditionally employed. One such buffering agent that may be advantageously used is triethanolamine, although the present invention is not limited to this particular buffering material. The buffering agent may be employed during the initial stages of the reaction, during both the initial stage and the modification stage, or not at all.

During the initial stage of the melamine-formaldehyde reaction, the reaction temperature is not critical although lower temperatures, such as room temperature, cause the reaction to progress rather slowly. At this point, the fully hydrolyzed PVA is added to the reaction. The amount of fully hydrolyzed PVA to be employed may vary from about 5% to 30% on a weight basis of the total weight of the melamine-formaldehyde reaction product solids. It is generally preferred, however, that the fully hydrolyzed PVA added be in an amount of from about 10% to 20% on a weight basis of the total weight of the melamine-formaldehyde reaction product solids. It is likewise preferred that during the reaction between the fully hydrolyzed PVA and the melamine-formaldehyde resin, a reaction temperature ranging from about 70° C. to the reflux temperature should be maintained, preferably about 80° C. to 90° C. The reaction should continue until the percent water tolerance of the reaction ranges from about 300% to about 500% in 5° C. water. The expression, percent water tolerance, is a well-known term in the resin art and simply means that a sample of resin can be diluted in a certain percent of its volume without displaying any milkiness, i.e. 300% water tolerance at 5° C. indicates that the given sample can be diluted in three times its volume of 5° C. water without displaying any milkiness. After the reaction product has reached the desired endpoint, it is cooled to ambient temperature and stored for coating use. If the resin produced is not viscous enough for coating purposes and penetrates the print paper during subsequent coating operations a small amount of a thickening agent, such as carboxyl methyl cellulose, sodium alginate or the like may be added with the other constituents during the reaction to correct this result. Additionally, stabilizers such as o,p-toluene sulfonamide may be added to extend the shelf life of the resin coating.

To this fully hydrolyzed PVA modified melamine-formaldehyde resin is added varying amounts of thinners, solvents, fillers, etc. so as to vary its viscosities and thereby cause the pigmented material to flow more than the resin in the decor sheet during the consolidation procedure.

The fully hydrolyzed PVA modified melamine-formaldehyde resin may be colored by the inclusion therein of any one of, or a combination of, inorganic or organic color pigments, extender pigments, metallic pigments, etc. The amount of pigment added to the resin will vary from 0.5% to 20%, based on the total weight of the resin, and dependent upon the pigment used and resultant color contrast desired. Typical inorganic pigments useful include those iron pigments ranging in color from yellow through red, reddish-brown, brown, brown to black. Such iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black, and white pigments such as titanium dioxide, titanium calcium, zinc oxide, zinc sulfide, antimony oxide, lithopone, etc. Although lead pigments may be used, they are preferably avoided because of the safety hazard involved in their use. Organic pigments which may be used include toluidine red, phthalocyanine blue and green, Vandyke brown, alizarin, madder lake, lithol red, and the like.

Useful metallic pigments include aluminum powder, copper powder, bronze powders available in various shades depending upon the alloy composition, zinc powder, gold and gold-like powders, and the like. Any of the pigments, and particularly the metallic pigments, may be used alone or in combination with each other or in combination with other pigments.

The fully hydrolyzed PVA modified melamine-formaldehyde resin is coated upon the print layer to a weight of from about 0.5 to about 20 grams per square foot, preferably about 5 to about 10 grams per square foot. The coating operation may be performed by a knife coater, reverse roll coater, or similar technique. The preferred coating process is the knife coater wherein the knife and resin dam are mounted on a roller, adjustment of the gap between the print sheet and the knife coater varies the coating thickness to its desired amount. The coating operation may be a separate operation or part of the impregnation operation. As a separate operation, the print sheet is first impregnated with a melamine-formaldehyde resin and subsequently dried before the coating operation is commenced. As part of the impregnation operation coating is performed on the wet print sheet immediately subsequent to impregnation on a single apparatus. In the present invention a combination of these two methods is preferred wherein the entire impregnation and coating processes are performed on a single apparatus which is provided with the means to impart a partial drying to the wet print sheet subsequent to impregnation yet prior to coating, preferably by passing the impregnated print sheet through a hot air oven before the coating operation. After coating, the print sheet undergoes a terminal drying operation in which the coated print sheet is dried to a volatile content of from about 4% to about 9%, preferably about 6%. The terminal drying imparts upon the coated print sheet the necessary flow characteristics for good bonding to take place in the subsequent heat-pressing operation.

A preferred process for manufacutirng a high-pressure laminate of the present invention is one in which 3 to 9 core sheets consisting of 6–20 mil. kraft paper have been impregnated with a 30% to 60% solution of phenol-formaldehyde resin so that the final resin solids content of the core sheets is about 20% to about 40% of the total weight of the core. Typically, these core sheets are oven dried after impregnation for a period of about one to two minutes at temperatures ranging from 140° C. to 170° C. The print layer consisting of a 50 to 120 pound basis weight per 3,000 square foot ream alpha cellulose pigmented sheet optionally displaying a print, pattern, or design, is impregnated with the melamine-formaldehyde resin so that the final resin solids content of the print sheet is from about 10% to about 40% of the print sheet, then partially dried, coated on its print bearing side with a fully hydrolyzed PVA modified melamine-formaldehyde resin and then terminally dried. The sheets are then stacked such that the print sheet is the top most sheet with its print bearing and coated side facing outward. The stacked sheets are placed between embossing press plates. The embossing press plates used in the novel process of the instant invention can be prepared by etching or machining a design on a metal plate. Alternatively, and more preferably, the plate can be prepared as disclosed in U.S. Pat. No. 3,718,496, which patent is hereby incorporated by reference. Still further, the raised printed design technique, as taught by Grosheim in U.S. Pat. No. 3,373,068, will also work well as an embossing medium in the instant invention. There is exerted upon these plates a pressure of from 800 to 1600 psi at temperatures from about 120° C. to 180° C. for approximately 20 minutes to effect the cure embossment and thereby provide the high-pressure laminate.

The embossed areas of the resultant laminate, i.e. those formed from the protuberances of the embossing plate and forming the valleys of the final embossment in the finished laminate surface should preferably be at least 0.007 inch deep. Depths of less than 0.007 inch are possible but not preferred because the color contrast is not as evident. Laminates of muted color differentials can be produced using embossments of these lesser depths however.

A preferred process for manufacturing a low-pressure laminate of the present invention is one in which a pressed particleboard of from about ⅜ to about 1 inch has stacked above it, in a manner identical to that employed in the high-pressure laminate, the print sheet. The print sheet being identical to the one employed in the high-pressure laminate. The stack is placed between polished stainless steel plates upon which there is exerted a pressure of from about 200 to about 600 psi at temperatures from 120° C. to about 180° C. for approximately 20 minutes to effect the cure and thereby provide the low-pressure laminate.

The release sheets used in the pressing of laminate of this invention, if necessary, are well known in the art and may be any non-adherable paper or non-adherable aluminum foil. The non-adherable paper may be a parchment type of paper of which a plurality are available commercially. The non-adherable metal foils, as well as the laminate of paper and the non-adherable foils, are also commercially available. Also suitable for this purpose are paper coated, treated or impregnated with polypropylene or the polyfluorocarbons and the like. Films of polypropylene may also be used. Silicone oil treated papers may be used and are also commercially available. Papers coated with sodium alginate and other salts of alginic acid are also suitable for this purpose and are available commercially. When "low pressure" laminates are being formed, no release sheet at all is necessary if the press plate has a releasing surface thereon.

The following specific examples illustrate certain aspects of the present invention and, more particularly, point out methods of evaluating the unique advantages the decorative laminate of the present invention provides. However, the examples are set forth for illustration only and are not to be construed as limitations on the present invention except as set forth in the appended claims. All parts and percentages are by weight unless otherwise specified.

EXAMPLE 1

Part A

A pigmented fully hydrolyzed PVA-modified melamine-formaldehyde resin is prepared by reacting melamine and formaldehyde together in a mole ratio of 1:1.8, respectively. The resin is modified with 10% fully hydrolyzed PVA on a weight basis of the total weight of the melamine-formaldehyde reaction product solids and pigmented with 0.5% brown iron-oxide, same basis.

Part B

An alpha cellulose print sheet exhibiting a tawny rawhide design with a basis weight of 50 pounds per 3000 foot ream is first impregnated with a conventional melamine-formaldehyde resin so that the final resin solids content is 29% of the print sheet. The impregnated sheet is then partially dried by passing through a hot air oven and then coated, on its print bearing side, with the pigmented PVA-modified resin of Part A. The pigmented PVA-modified resin of Part A has flow sufficiently great enough to cause said pigmented resin to flow more than the conventional melamine-formaldehyde resin impregnated print layer. The coating is applied by a knife coater adjusted to place a coating weight of 6.0 grams per square foot upon the print sheet. The coated sheet is then terminally dried to a 4% volatile content and 16% resin flow.

Part C

Six phenolic impregnated kraft paper sheets having a basis weight of 115 pounds per 3000 foot ream are stacked together. Each kraft sheet is impregnated so that the final resin solids content is 27% of the kraft sheet. The coated print sheet is next placed upon the six assembled kraft sheets such that the print bearing, coated side faces upward. Upon the print sheet is placed a release sheet and a textured leather embossing master plate. This assembly is pressed at 1400 psi a 145° C. for 20 minutes, cooled, trimmed and sanded.

The resulting laminate gives a leather-like appearance displaying variations in color intensity—high pressure areas being lighter and low pressure areas being darker.

EXAMPLE 2

The procedure of Example 1 is followed in every material detail except that the amount of fully hydrolyzed PVA employed in Part A is 30%, the amount of pigment employed is 18%, the pigment employed is Vandyke brown, the coating weight in Part B is 1.0 grams per square foot, and the embossing master employed in Part C is an open weave textured plate. The resulting laminate is a brown open weave embossed sheet having excellent physical and chemical properties.

EXAMPLE 3

The procedure of Example 1 is followed in every material detail except that the amount of fully hydrolyzed PVA employed in Part A is 20%, the amount of pigment employed is 6%, the pigment employed is lamp black, the coating weight in Part B is 10 grams per square foot, and the embossing master employed in Part C is a slate textured plate. The resulting laminate is a black slate embossed sheet exhibiting excellent physical and chemical properties.

EXAMPLE 4

The procedure of Example 1 is followed in every material detail except that the amount of fully hydrolyzed PVA employed in Part A is 5%, the amount of pigment employed is 1%, the pigment employed is titanium dioxide, the coating weight in Part B is 18 grams per square foot, and the embossing master employed in Part C is a tile textured plate. The resulting laminate is a white tile embossed sheet exhibiting excellent physical and chemical properties.

EXAMPLES 5–8

When the procedure of Examples 1–4 is followed in every material detail except that a ½ inch pressed particleboard constitutes the core layer and the pressure and temperature are 300 psi and 145° C., respectively, substantially equivalent results are obtaind for a low-pressure laminate.

What is claimed is:

1. A heat and pressure laminate assembly consisting essentially of, in superimposed relationship,
   (a) a core layer comprised of a self-supporting substrate;

(b) a resin impregnated print layer consisting of an opaque alpha cellulose paper sheet;

(c) a pigmented surface coating of a hydrolyzed polyvinyl alcohol having a degree of hydrolysis equal to or greater than about 99.0 percent of the acetate groups modified melamine-formaldehyde resin wherein the surface coating weight is from about 0.5 to about 20.0 grams per square foot, the amount of fully hydrolyzed polyvinyl alcohol in the surface coating is from about 5 to about 30 percent by weight of the total weight of the melamine-formaldehyde reaction product solids and said pigmented surface coating has a flow sufficient to cause said pigmented surface coating to flow more than said resin impregnating the print layer; and (d) an embossing press plate having a surface with protuberant and valley areas capable of being impressed into the uppermost surface of said print layer and means for preventing the embossing press plate from sticking to the coated print sheet during lamination.

2. The assembly of claim 1 wherein the core layer comprises a plurality of kraft paper sheets impregnated with an alkaline catalyzed phenol-formaldehyde condensation product.

3. The assembly of claim 1 wherein the hydrolyzed polyvinyl alcohol modified melamine-formaldehyde resin is the reaction product of melamine, formaldehyde and hydrolyzed polyvinyl alcohol having a degree of hydrolysis equal to or greater than about 99.0 percent of the acetate groups on a dry basis wherein the molar ratio of melamine to formaldehyde is about 1:1 to about 1:3, respectively.

4. The assembly of claim 1 wherein the amount of formaldehyde employed in the surface coating is from about 1.3 to about 2.0 moles per mole of melamine employed.

5. The assembly of claim 1 wherein the amount of hydrolyzed polyvinyl alcohol employed is in the range of from about 10 to 20 percent by weight of the total weight of the melamine-formaldehyde reaction product solids in the surface coating.

6. The assembly of claim 1 wherein the amount of pigment added to the surface coating resin varies from 0.5 to 20.0 percent by weight of the total weight of the melamine-formaldehyde reaction product solids.

7. The assembly of claim 1 wherein the coating weight is 5 to 10 grams per square foot.

8. A method for producing a heat-and-pressure consolidated laminate which comprises consolidating the assembly of claim 1 under heat and pressure to thereby effect a lamination of said fibrous sheets together, an embossment of the uppermost of the print sheet and a migration of the pigmented resin from the areas of said embossment corresponding to the protuberant areas of the embossed press plates to the valley areas thereof and thereafter removing said embossing press plate from the resultant laminate so as to produce a dense laminate having embossed areas of contrasting color.

9. A heat-and-pressure consolidated laminate of registered embossment and color contrast comprising, in superimposed relationship, (a) a core layer comprised of a self-supporting substrate;

(b) a resin impregnated print layer consisting of an alpha cellulose paper sheet; and (c) a pigmented surface coating of a hydrolyzed polyvinyl alcohol having a degree of hydrolysis equal to or greater than about 99.0 percent of the acetate groups modified melamine-formaldehyde resin wherein the surface coating weight is from about 0.5 to about 20.0 grams per square foot, the amount of hydrolyzed polyvinyl alcohol in the surface coating is from about 5 to about 30 percent by weight of the melamine-formaldehyde reaction product solids and the pigmented surface coating has a flow sufficient to cause said pigmented surface coating to flow more than said resin impregnating the print layer, and the surface of said laminate contains an embossment consisting of protuberances and valleys, each of which are of a different color.

* * * * *